July 10, 1962 P. V. PALMQUIST ETAL 3,043,196
REFLECTIVE MARKING AGGREGATE
Filed Sept. 18, 1957
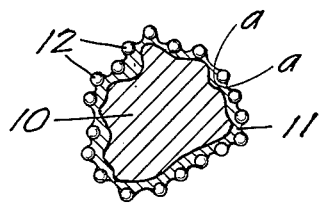
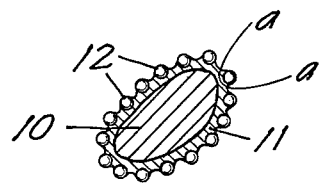
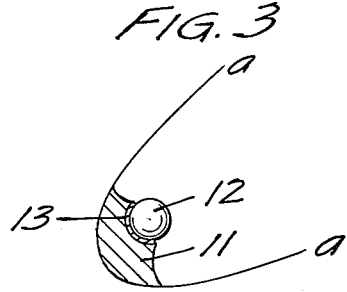
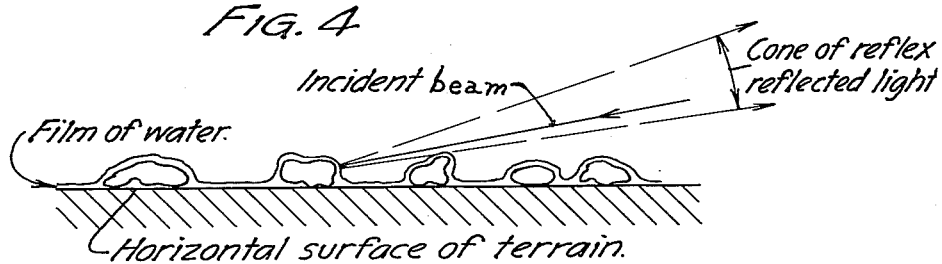
INVENTORS
PHILIP V. PALMQUIST
EUGENE L. M<sup>C</sup>KENZIE
THOMAS L. HARRINGTON
BY
Carpenter, Abbott, Coulter & Kinney
ATTORNEYS З,043,196
REFLECTIVE MARKING AGGREGATE
Philip V. Palmquist, Maplewood, Eugene L. McKenzie, North St. Paul, and Thomas L. Harrington, St. Paul, Minn., assignors to Minnesota Mining and Manufacturing Company, St. Paul, Minn., a corporation of Delaware
Filed Sept. 18, 1957, Ser. No. 684,692
6 Claims. (Cl. 88—82)

This invention relates to handleable, crush-resistant, discrete, reflex-reflecting particles. The particles hereof comprise aggregates of small transparent sphere-lenses associated in optical connection with underlying light-reflecting means so as to produce brilliant reflex-reflection of an incident beam of light striking the same, regardless of the angle at which the incident beam strikes the particles when they are supported in positions of use.

The reflective aggregate of this invention is particularly useful in providing attention-getting, highly-visible markers for flat horzontal surfaces such as aircraft runways, shoulders of highways, highway center islands or dividers for traffic lanes, etc., where improvements in the nighttime visible perception of a route or runway for great distances ahead is desired by operators of vehicles, especially the operators of automobiles, aircraft, and the like. There are, of course, many other uses for the reflective aggregate of this invention. For example, it may be used in marking bridge abutments, curves, curbs, guideposts, slanted dividers for traffic lanes, etc. Primarily, however, it will be found most useful in marking applications designed to render the path of horizontal surfaces such as roadways and the like visible for great distances ahead, and this result may be accomplished in accordance with the teachings to follow even under adverse conditions such as during periods of rainfall.

During rainfall, a thin film of water is coated over the horizontal surfaces of a roadway, and this film of water causes beams from the headlights of an automobile to be largely reflected off of it at distances over about 100 feet ahead of the automobile. Over approximately 82% of the light from automobile headlights is so reflected off such a water film at distances of 100 feet or more ahead of the automobile. Thus, such light is lost to the driver of the automobile; and under such conditions, he gains the impression that the highway is "pitch black" ahead.

Highway center islands marked with the reflective aggregate of this invention, however, remain visible to the driver of an automobile during periods of rainfall for distances as great as 500 feet or more ahead, as will be shown.

While flat surfaced structures, which function to provide reflex reflection even when covered with water are known (see U.S. Patent No. 2,407,680 to Palmquist et al.), such structures do not have the high angularity characteristics required for horizontal roadway use. (For a supplemental discussion of various reflex light reflecting principles, including that of angularity, see U.S. Patent No. 2,294,930 to Palmquist). In markers for horizontal surfaces, extremely high angularity is required in order for an incident beam of light from a vehicle such as an automobile to be substantially reflected back toward the occupants in a brilliant cone having its axis essentially common with the incident beam; this being the essential feature of reflex light reflection.

Contrary to teachings in U.S. Patent No. 2,407,680 to the effect that a flat surface is required to prevent water-caused blackout, this invention provides a solution to the problem of water-caused blackout in reflex reflecting structures without necessarily employing a flat surface. Instead, it has been found possible to use a lenticular or pebbly surface such as that presented by a plurality of beads about half embedded in a binder, even though prior art, as aforenoted, suggests the inability of such a structure to function to provide brilliant reflex reflection when coated with a film of water. The elements of our reflective aggregate, and the arrangement thereof whereby such a result is accomplished, constitute material features of this invention.

In a broad sense, however, this invention provides the art for the first time with a practical composite mixture of brilliantly reflex-reflecting articles useful in providing horizontal surface markings which are visible to the occupants of an automobile, or the pilot of an aircraft, for great distances ahead under both wet and dry nighttime conditions. Also provided by this invention is a new article of manufacture which is conveniently handled and which is brilliantly reflex-reflecting regardless of the direction of an incident beam striking the same. Additionally, this invention provides an article of manufacture comprising a sturdy core surrounded by transparent sphere-lenses which are bonded to the core and which additionally are equipped with minute reflecting means lying internally of the structures so as to produce brilliant reflex reflection of an incident beam striking the article.

The reflection of light effected by the minute reflecting means underlying sphere-lenses of the aggregate hereof is characterized as specular, as opposed to diffuse or scattered, inasmuch as mirror-like reflection predominates in the structure. The preferred form for the minute reflecting means to assume is that of a thin, essentially, hemispherical coating of silver or the like on the back extremity of the sphere-lens, i.e., the portion lying internally of the structure of the aggregate.

The attainment of necessary optical and structural relationships in the aggregate hereof will readily be realized as one presenting a serious manufacturing problem. The sphere-lenses are spread over the surface of an underlying lithic core member and are about half buried, i.e., about half embedded, in a durable, chemical-resistant, weather-resistant, and solvent-resistant binder. Since the core of the aggregate hereof may assume a variety of shapes and have varying degrees of pits and irregularities on its surface, a serious problem arises as to how to provide such a core material with a brilliantly reflex-reflecting coating wherein a plurality of light reflecting sphere-lenses are oriented with each having an essentially-hemispherical, specular, light-reflecting coating on its back extremity. To accomplish this in an economical manner so that the resulting aggregate can be made available at a reasonable price for extensive highway marking use will be seen to further complicate the problem. As an added advantage of this invention, however, a practical solution to the problem of making of the aggregate hereof in an economical manner is provided.

The features of our invention will be explained in connection with an illustrative drawing made a part hereof, wherein:

FIGURES 1 and 2 are schematic views in cross section through reflective aggregate articles of this invention;

FIGURE 3 is an enlargement of the looped portions "a" of FIGURES 1 and 2; and

FIGURE 4 is a schematic side elevation illustrating a highway center island provided with the reflective aggregate of this invention.

Several specific embodiments of our invention will now be explained in connection with illustrative, but non-limitative, examples.

EXAMPLE 1

Reflective aggregate of this invention in particle sizes greater than about 20 mesh and smaller than about 10 mesh was prepared as follows:

First, greystone rock was crushed and screened to collect chips of a size between about 10 and 20 mesh, i.e., chips small enough to pass through a 10 mesh screen and too large to pass through a 20 mesh screen. About 100 pounds of the collected greystone granules were charged into a mortar mixer and blown with air to remove dust. To the greystone granules in the mixer was then added about 4 pounds of a bond solution consisting of about 25 parts epoxy resins and about 25 parts polyamide resin dissolved in about 50 parts of toluene.

Epoxy resins, i.e., resinous glycidyl polyethers, are available commercially, and have, on the average, more than one 1,2-epoxy group in a molecule. They may be produced by the reaction of 2,2-bis(4-hydroxyphenol) propane (i.e., Bisphenol A) and epichlorhydrin in alkaline media at elevated temperatures within the approximate range of 50–150° C. In the reaction, Bisphenol A may be replaced in whole or part by various other polyhydric phenols, e.g., resorcinol, 2,2 - bis(4-hydroxyphenyl)-butane, etc., or polyhydroxy compounds such as ethylene glycol, etc. Likewise, sources of epoxy radicals other than epichlorhydrin may be employed in the reaction. As the epoxy resins employed in preparing the aggregate of this example, a mixture of equal parts of "Epon 828" and "Epon 1001," both marketed by the Shell Chemical Corporation, was used. "Epon 828" is a liquid epoxy resin, which melts at 8–12° C., has a Gardner-Holt viscosity at 25° C. of Z5 to Z6, and an epoxide equivalent of about 190 to 210. In other words, about 190 to 210 grams of this resin contain one gram equivalent of epoxide, i.e., oxirane oxygen. "Epon 1001" is a solid epoxy resin (prepared by using less epoxy radical source material in the reaction mixture than in the case of preparing liquid epoxy resins) melting at about 64–76° C. It has an epoxide equivalent of about 450 to 525. Its color is up to a maximum of 8 on the Gardner scale.

The polyamide resin of the formula reacts with the epoxy resin to produce hardening of the composition, and is the addition product of polymerized long chain fatty acids and polyfunctional primary and secondary amines. The particular polyamide resin chosen for the foregoing composition was "Versamid 125," stated by its manufacturer, General Mills, Inc. to have an average molecular weight of 2,000, an acid number of 7, and a Brookfield viscosity of about 45,000 to 55,000 centipoises at 23° C.

After adding the bond solution to the greystone granules in the mortar mixer, the batch was tumbled and mixed until essentially all of the toluene evaporated. During this mixing the granules were essentially completely coated with a layer of the epoxy and polyamide mixture. In the first stage of mixing, the solution of epoxy and polyamide resins flowed over the granules and even tended to cause some clumping together of the coated granules. Continued mixing, however, served to break clumps of the resin coated granules; and evaporation of solvent left the resin coatings at the desired degree of tackiness or stickiness for subsequent processing steps but insufficient to cause clumping. It will be evident, therefore, that by employing a coating composition and technique such as described, the resulting tacky coated granules resist clumping and remain in discrete particle form, as desired.

To the tacky coated granules in the mixer was then added about 100 pounds of silver-coated glass beads. The beads themselves were formed of transparent glass having a refractive index of about 1.92, and a specific gravity of about 3.6. Beads of an average diameter ranging from about 30 to 70 microns were employed.

These beads had been previously coated with silver using the following procedure: 1,200 pounds of de-ionized water were charged into a stainless steel mixing vessel, and 12 pounds of silver nitrate dissolved therein. Next 300 pounds of clean beads were added, followed by 25 pounds of a 28% aqueous ammonia solution, 42 pounds of a 23.8% water solution of dextrose and 42 pounds of a 15.8% water solution of potassium hydroxide. The contents were stirred and the reaction allowed to proceed for about 15 minutes in the mixing vessel. Then the contents were poured in a filter vessel where the silver-coated beads were collected and separated from the solution of other ingredients. The beads were subsequently washed with water and dried by vibrating them over a heated plate. Normally 300 pounds of beads may be silvered in the batch as here described, but the size of the batch of beads to be silvered varies depending upon the average bead size in the batch, smaller batches being used when beads of smaller average diameter are treated.

After adding the silvered beads to the tacky coated granules, as aforedescribed, agitation or tumbling of the mixer was continued for only so long as required for distribution of the silver-coated beads over the tacky surface of the granules. The sticky resin surfaces of the granules rapidly picked up the beads and very little mixing was needed to effectively coat the granules with the beads. The beads in the coating were about half embedded in the sticky resin.

The batch from the mixer was then poured on to a 40 mesh screen, where loose beads representing any excess were removed by vibrating the screen and allowing the loose beads to fall through. Following this, the aggregate was allowed to age at room temperature for at least 24 hours to obtain at least a partial cure of the resin bond. It was then treated with an etching solution to remove the silver coating from the outer exposed bead surfaces.

For etching, the aggregate was poured into a solution formed by adding about 3.4 pounds of potassium dichromate and 11.5 pounds of concentrated sulfuric acid to about 405 pounds of water. After about 20 seconds, the etching solution was drawn from the aggregate and the etched aggregate washed with water. The wet aggregate was then placed in an oven and heated to about 220° F. for about 16 hours to dry it and essentially fully cure the resin bond coating. The resulting cured resin bond coating was resistant to attack by alkalis such as may normally be found on highway and adjacent surfaces. It was insoluble in all common solvents, and resistant to degradation by weathering. It effectively held the minute reflex-reflecting elements in position.

EXAMPLE 2

The procedure of Example 1 was followed except that the silvered beads employed here were formed using transparent glass beads or sphere-lenses having a refractive index of 2.5, a specific gravity of 6.1, and an average diameter in the range of 30–70 microns.

EXAMPLE 3

Aggregate prepared as in Example 1 was mixed with an approximately equal amount of aggregate prepared as in Example 2 to provide a composite mass which brilliantly reflected beams of light directed upon it under either wet or dry conditions, regardless of the angle of the incident beam.

Under dry conditions, the reflective aggregate particles of Example 1 function efficiently to provide brilliant reflex reflection of incident beams of light directed upon it, and in cases where brilliant reflex reflection of incident beams of light is needed under dry conditions (for example, on surfaces shielded from rainfall, whether horizontal or at an angle to the horizontal), the aggregate of Example 1 may be used alone.

Where brilliant reflex reflection is desired under wet conditions, as where the aggregate is coated with a thin film of water, the aggregate formed as in Example 2 performs most efficiently.

The composite mixture of aggregate of this example, however, functions to provide brilliant reflex reflection of light under either wet or dry conditions, and is particularly suitable for use in marking inclined edges of highways, center islands, curbs, bridge abutments, etc. It may be easily bonded as an irregular scattered layer on such surfaces by using conventional paint films as the bonding medium to secure the aggregate to the inclined surface; and under varied wet or dry conditions, a beam of light striking the mixture of aggregate at any angle of incidence is reflex reflected in a brilliant cone having its axis essentially common with the incident ray.

Using an aggregate mixture such as described in this example in size ranges from about 20 mesh up to about 10 mesh, aircraft runways have been made visible to pilots for distances up to approximately 2½ miles, by reflex reflection of light beams originating from the wing lights of the aircraft in flight. No other reflective marking system is known to be able to even approach such a result.

EXAMPLE 4

Certain critical requirements for the size of the reflective aggregate of this invention must be met where it is used for marking horizontal, essentially flat surfaces such as highway center islands and the like so that they remain visible to the occupants of an automobile for great distances ahead under wet conditions at night. The aggregate for this use must be at least 8 mesh or greater, i.e., must be of a size sufficiently great so that the aggregate is retained and does not pass through a screen of about 8 mesh. Extremely large aggregate, e.g., aggregate over about 1 inch average diameter, may be employed successfully for long distance marking of horizontal surfaces during rainfall as taught herein, but such larger sizes offer little or no advantage over sizes in the range of about ⅛ inch average diameter up to an average diameter approaching 1 inch. Additionally, convenience of handling is sacrificed in the case of sizes greater than 1 inch in average diameter. Preferred sizes of aggregate used for the purpose here discussed lie in the range of about ⅛ inch to about ½ inch average diameter. It will be appreciated that the concept "average diameter" as used herein refers to the average particle size as determined by screening and does not connote a true diameter or a true spherical shape for the particles. Indeed, crushed or chipped material useful in the manufacture of the aggregate hereof may be of any irregular shape, as evident from the examples hereof.

The critical importance of the use of aggregate having an average diameter of at least about ⅛ inch for rendering horizontal surfaces visible from an automobile for great distances ahead at night during rainfall is illustrated by the following experiment. Aggregate of various sizes as noted in Table 1, prepared according to teachings such as set forth in Example 2, was sprinkled at various concentrations as noted in the table over strips 100 feet long and 1 foot wide on an asphalt highway, after first applying a paint vehicle over the area of each strip. Small sizes of aggregate were well bonded in this paint vehicle as it dried on the underlying asphalt horizontal surface, whereas larger sizes were relatively poorly so bonded. (For larger sized aggregate, strong bonds can be formed by pressing the aggregate partially into a molten asphalt coating.) The concentration of aggregate for each size was varied so as to produce approximately equal brilliance of reflection for each strip under rainy nighttime conditions, as will be explained. During a rainstorm at night, the relative effectiveness of each strip as a long distance marker was tested by directing the headlights of an automobile thereupon (as illustrated in FIGURE 4). The results are set forth in the table.

Table 1

| Aggregate Size | Concentration, lbs./yd.² | Distance from which strip was visible to driver of automobile in rainstorm, feet |
| --- | --- | --- |
| 40-20 mesh | 0.10 | 100 |
| 20-10 mesh | 0.22 | 250 |
| 10 mesh-⅛" | 0.41 | 300 |
| ⅛"-¼" | 0.74 | 750 |
| ¼"-⅜" | 1.25 | 750 |

Based on the foregoing, it is evident that an aggregate size of at least about ⅛ inch average diameter is required for visible perception on a horizontal surface by reflex reflection at a distance of 500 feet or more in front of an automobile during wet weather. Visible perception of objects at a distance of 500 feet ahead is generally considered by safety experts as a minimum requirement for safe, high-speed driving at nighttime.

In Table 2 are set forth the approximate proportion by weight of glass beads, resin bonding material and lithic core substance for the aggregate of each particle size employed in the foregoing test.

Table 2

| Aggregate Size | Glass Beads | Resin Bond | Core |
| --- | --- | --- | --- |
| 40-20 mesh | 36.3 | 3 | 60.7 |
| 20-10 mesh | 17.7 | 2 | 80.3 |
| 10 mesh-⅛" | 13.6 | 1.2 | 85.2 |
| ⅛"-¼" | 7.3 | 0.8 | 91.9 |
| ¼"-⅜" | 5.4 | 0.6 | 94.0 |

From Table 2 it is seen that a greater quantity by weight of the larger sized aggregate is needed for a brilliance of reflex reflection theoretically closely equivalent to that which should be obtained using relatively smaller quantities of the smaller sized aggregate. This is true since the total quantity of sphere-lenses, which govern the amount of autocollimated light, is relatively lower per unit of weight for the larger sized aggregate than per unit of weight for the smaller sized aggregate. Thus, the varied concentration of aggregate per square yard as noted in Table 1 is necessary for a theoretical, essentially equivalent, reflex reflection for each strip.

EXAMPLE 5

A large sized reflective aggregate especially designed for use on highway shoulders, where it is not bonded but lies as loose rock upon the shoulder, has been prepared by the following method. Approximately 600 grams of traprock screened to a size range between about ¾ inch to about 1 inch was dipped into a solution made up of about 16.5 parts of an epoxy resin ("Epon 1001"), and 16.5 parts of a polyamide resin ("Versamid 125") dissolved in about 67 parts of toluene. The dipped aggregate was withdrawn from the solution and placed on a screen to drain and air dry until essentially all solvent evaporated. The resulting tacky resin coated rock was then mixed in a tumbling mixer with 100 grams of silver-coated beads, prepared as described in Example 1, after which excess beads were removed from the mixture by vibratory screening employing a 40 mesh screen. About 10 grams of beads adhered to the 600 grams of aggregate. The coated aggregate was then aged, etched, dried and cured as in Example 1.

One of the primary advantages of aggregate in the size range described in this example lies in its ability to remain in place upon a horizontal surface even though not bonded to the surface, and in its ability to resist being covered by loose gravel and the like. As in Example 3, beads of approximately 1.9 refractive index and of approximately 2.5 refractive index were used in preparing separate batches of aggregate of the size described in this example, after which the batches were mixed together to provide a composite mixture of aggregate capable of brilliantly reflecting incident light under both wet and dry conditions.

The larger size aggregate of this example may also desirably be used to reflectorize median strips, particularly those which may be characterized as "rumblized" strips between lanes of a highway. "Rumblized" strips are those which consist essentialy of small rocks or the like piled in random fashion.

EXAMPLE 6

In place of epoxy resin bond of the foregoing examples, a polyurethane resin bond was used to affix glass beads to an underlying lithic core member. Except as here indicated, the conditions of treatment and procedure employed in Example 1 were also employed in preparing the articles of this example.

Approximately 8 parts of a urethane resin bond solution was applied to approximately 200 parts of a core material consisting of a pea-type gravel in the ⅛ to ⅜ inch screen size range. The urethane bond solution consisted of 14.1 parts of "Mondur C" and 18.8 parts of "Multron R–10" dissolved in about 67.1 parts of ethyl acetate.

"Mondur C" is the trade name used by Mobay Chemical Co., the supplier of this material, for a polyfunctional isocyanate adduct believed to consist of the reaction product formed by reacting stoichiometric quantities of toluene di-isocyanate and trimethylol propane at about 60° C. and at about 60% by weight solids concentration in ethyl acetate solution. The isocyanate radicals (NCO) in "Mondur C" account for approximately 14.2% of its weight. As used in this example "Mondur C" consisted of approximately 75% by weight of resin solids dissolved in ethyl acetate.

"Multron R–10" is the trade name used by its manufacturer, the Mobay Chemical Co., for a polyester compound which is heat reactive with "Mondur C" to produce a non-tacky cured resin mass. "Multron R–10" is believed to consist in essential respects of the reaction product of phthalic anhydride and adipic acid with diethylene glycol and trimethylol propane. It is stated by its manufacturer to have an OH number of 205–220, an acid number of less than 4, a viscosity at 163° F. of about 640–840 centipoises, and a density at 77° F. of 1.13. As used in this example "Multron R–10" consisted of approximately 50% by weight of solids dissolved in ethyl acetate.

The bond solution was mixed with the pea-gravel until the solvent, ethyl acetate, was essentially completely evaporated. This mixing resulted in the gravel being essentially completely coated with a sticky urethane coating. Then 200 grams of silver-coated beads were added and agitation of the mixture continued for only so long as required for the sticky coating of the core material to pick up the silvered beads and become surface coated therewith. The loose beads were then separated from the coated aggregate, after which the coated aggregate was held at about 350° F. for two hours to effect curing of the polyurethane bond. The product was then etched and dried as in Example 1.

Two different batches of reflective aggregate prepared according to this example were formed, as in Examples 1 and 2, using beads having the different refractive indices noted, and the batches then mixed to provide a composite mass capable of reflecting light directed upon it under either wet or dry conditions, and regardless of the angle of the incident beam.

Referring now to FIGURES 1, 2, and 3, the reflective aggregate of the foregoing examples will be noted to comprise a rigid core member 10 coated with a bond coating 11 and a light returning layer of small transparent sphere-lenses 12 having internal light-reflecting means 13 underlying the spheres and associated in optical connection therewith. As particularly illustrated in FIGURE 3, each sphere-lens, i.e., glass bead 12, of the aggregate is oriented in position in front of the mirror-like hemispherical light-reflecting surface of coating 13 which is contiguous with the back extremity of the sphere-lens. Bond coating 11 is interposed between the approximately hemispherical coating of silver 13, or equivalent, on the sphere-lenses 12, and the central core member. The optical arrangement, as illustrated in FIGURE 3, is such that the brilliance of light reflection for our aggregate is far in excess of that for white paint surfaces, reflective brilliancies as high as 450 times, or more, that of white paint being easily obtained using aggregate formed by the procedure illustrated in Example 1 hereof.

Where brilliance of reflex reflection can be sacrificed to some extent, aluminum flake or the like may be used as the specular reflecting means underlying sphere-lenses about a rigid central core member.

The rigid cores for the aggregate of this invention may be irregular in shape, spherical, or elliptical as afore-illustrated. Materials such as crushed rock, gravel, etc., screened to particle sizes according to the principles afore-elucidated, have been found suitable. Generally the core material employed will have a specific gravity between about 2.4 and 2.9, but some expanded lithic materials having a specific gravity as low as about 1.5 have been found satisfactory. Other materials, even those of lower specific gravity, may be found useful.

For the bond material applied as a coating around the rigid core, it has been found preferable to employ heat-curable or thermosettable resin compositions which are nonbrittle, tough, chemically-resistant, weather-resistant, and solvent-resistant in the cured state, as illustrated. Other suitable materials, however, may be employed to affix the sphere-lenses in place about the central core so long as the essential optical characteristics aforediscussed are maintained. In this respect it is important to select materials for the bond which do not flow over and fully encapsulate the silver-coated beads, thereby preventing access to the outwardly-facing hemisphere of silver which must be removed from the beads before they can serve as minute lenses as required. Thus, heat-curable resin materials for this bond must be, and remain, sufficiently viscous and sticky so as to retain the silver-coated beads in position during any curing cycle, and steps preliminary thereto; and such resins should not flow over the coated beads partially embedded therein.

The effective refractive index of beads or sphere-lenses to be used in preparing the aggregate hereof is preferably approximately 1.9 in cases where brilliant reflex reflection of the highest order is desired under dry conditions, and preferably approximately 2.5 in cases where brilliant reflex reflection of the highest order is desired under wet conditions, as when aggregate surfaces are coated with a thin film of water. In general, however, sphere-lenses of mixed refractive index, as well as of refractive indices varying from about 1.7 to about 2.9, can be used to produce products of a useful character.

A characteristic of the products hereof employing beads of a refractive index of 1.9 and 2.5 is the lenticular nature of their surfaces. It is imperative, for reflex reflection of the most brilliant character during periods of rainfall when my lenticular-surfaced articles employing beads of 2.5 refractive index are coated with a thin film of water, that such beads be only partially embedded in the resin bond coating, and that the outer hemispherical portion of the beads be left exposed so as to be free for contact with water. The attainment of this critical requirement in small but bulky aggregate articles as here discussed is readily accomplished by following the teachings hereof, even though extremely small beads having an average diameter between about 15 and 125 microns constitute the preferred sizes to employ in the making of the aggregate. Other factors being equal, beads within the size range from 15 to 125 microns have been found to provide the greatest brilliance of reflex reflection in our aggregate structures.

If desired the reflective aggregate hereof may be made so as to appear colored under either daytime or nighttime conditions, or both. For example, the bond layer may be colored by pigments or dyes, and the sphere-lenses themselves may be formed of colored glass. Advantageously, our aggregate, as illustrated in the examples, can be formed so as to present the appearance of ordinary dull and dirty rock or stone during daytime, and yet be fully effective for brilliant reflex reflection of light directed upon it at night.

That which is claimed is:

1. Individual particles of reflective aggregate having an average diameter not over one-half inch, each handleable as a separate article and being adapted for use in providing markers of efficient reflex reflection of incident beams of light striking the same, said particles of reflective aggregate comprising a rigid core member, and an adherent coating over said core member, said coating comprising a light-returning layer of small transparent sphere-lenses with internal specular light-reflecting means underlying said sphere-lenses and in optical connection with the back extremity thereof so as to produce reflex reflection of light directed upon said aggregate, regardless of the angle of incidence of said directed light, said sphere-lenses having a refractive index of at least 1.7.

2. In a structure comprising a vehicular traffic lane and a border along at least one side thereof, the improvement consisting essentially of a spread of a plurality of articles satisfying the requirements of claim 1.

3. Reflective aggregate particles having an average diameter size between approximately ⅛ inch and 1 inch, said particles comprising a rigid core member and a light-returning layer of small transparent sphere-lenses bonded to said rigid core member and a specular, essentially-hemispherical, light-reflecting coating underlying each of said sphere-lenses and being in optical connection with the back extremities thereof so as to produce reflex reflection of light directed upon said particles regardless of the direction from which said light originates, said sphere-lenses being of a size up to approximately 125 microns in average diameter and having a refractive index of at least 1.7.

4. Individual particles of reflective aggregate having an average diameter not over one-half inch, each handleable as a separate article and adapted for use in providing markers of efficient and brilliant reflex reflection of incident beams of light striking the same, said particles of aggregate comprising a rigid core member, a chemical-resistant, weather-resistant and solvent-resistant coating over said core member, and, rigidly affixed to said coating, a light-returning layer of small transparent sphere-lenses having a refractive index of at least 1.7, said sphere-lenses having specular, essentially-hemispherical, light-reflecting coatings in optical connection with the back extremities thereof so as to produce reflex reflection of a beam of light directed upon said aggregate regardless of the angle of incidence of said light, the outwardly-facing, approximately-hemispherical portion of said sphere-lenses being exposed to surrounding air.

5. Particles of reflective aggregate as set forth in claim 4 wherein at least some particles contain sphere-lenses having a refractive index of approximately 2.5.

6. Individual particles of reflective aggregate, each handleable as a separate article and adapted for use in providing markers of efficient and brilliant reflex reflection of incident beams of light striking the same, said particles of aggregate being of a size capable of passing through a screen having openings approximately one inch square in area, and comprising a rigid core member and an adherent coating about said core member, said coating comprising a light-returning layer of small transparent sphere-lenses having a specular, essentially-hemispherical, light-reflecting coating on the back extremities thereof so as to produce reflex reflection of a beam of light directed upon said aggregate at any angle of incidence, said sphere-lenses and associated light-reflecting coating being rigidly bonded to said core member by a substantially fully cured, tough and weather-resistant resin, the refractive index of said sphere-lenses being at least 1.7 and the average diameter thereof being in the range of from 15 to 125 microns.

References Cited in the file of this patent

UNITED STATES PATENTS

| | | |
|---|---|---|
| 1,879,799 | Glaesel | Sept. 27, 1932 |
| 1,902,440 | Gill | Mar. 21, 1933 |
| 1,986,591 | Meyer | Jan. 1, 1935 |
| 2,139,824 | Higgins | Dec. 13, 1938 |
| 2,330,096 | Waters | Sept. 21, 1943 |
| 2,345,644 | Weber | Apr. 4, 1944 |
| 2,529,576 | Scanlon | Nov. 14, 1950 |
| 2,675,739 | McGrath | Apr. 20, 1954 |
| 2,732,311 | Hartwright | Jan. 24, 1956 |
| 2,807,556 | Stark | Sept. 24, 1957 |
| 2,937,668 | Carey et al. | May 24, 1960 |

FOREIGN PATENTS

| | | |
|---|---|---|
| 481,505 | Great Britain | Mar. 7, 1938 |
| 688,310 | Great Britain | Mar. 4, 1953 |